J. W. FREES & L. WINTER.
AUTOMATIC ELECTRIC LIGHTING SYSTEM.
APPLICATION FILED MAY 2, 1910.
994,146.
Patented June 6, 1911.
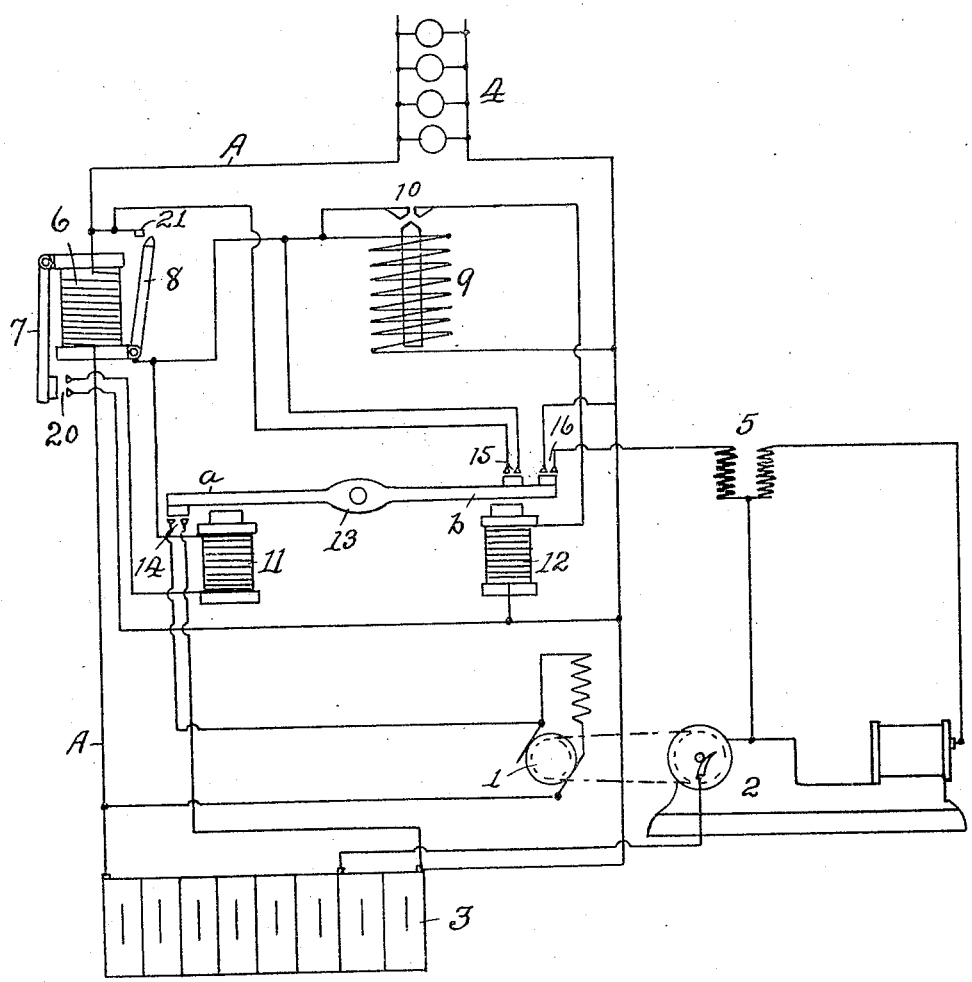
John W. Frees and
Louis Winter
Inventors
Witnesses
O. L. Pierce
J. O'R. Kelly
By E. Fa. Bell,
Attorney

UNITED STATES PATENT OFFICE.

JOHN W. FREES AND LOUIS WINTER, OF READING, PENNSYLVANIA.

AUTOMATIC ELECTRIC-LIGHTING SYSTEM.

994,146.          Specification of Letters Patent.     Patented June 6, 1911.

Application filed May 2, 1910. Serial No. 558,751.

*To all whom it may concern:*

Be it known that we, JOHN W. FREES and LOUIS WINTER, citizens of the United States, residing at Reading, in the county of Berks and State of Pennsylvania, have invented certain new and useful Improvements in Automatic Electric-Lighting Systems, of which the following is a specification.

This invention relates to improvements in automatic electric lighting systems and our object is to provide a system in which the battery is automatically charged when the current is used at or above a certain predetermined rate, and in which when the current is not being used the battery is disconnected from the other units in the plant as soon as it has attained its predetermined high voltage, at which time the generation also ceases due to the stopping of the engine.

The arrangement is such that the turning on of lights to or above a certain number or the use of current for any purpose at or above a certain rate will immediately start the engine and generator to charge the battery, and when the use of current ceases, the battery is disconnected from the system, provided it has attained full charge. If however, when the use of current ceases the battery is not fully charged, it will continue to operate until such full charge has been attained, when the engine and generator will stop automatically. In other words, a system in which the use of current at or above a certain rate causes an instrument to close a circuit by which the system is placed in position to stop automatically.

The invention is more fully described in the following specification and clearly shown in the accompanying drawing which shows a diagram of our system.

The numeral 1 designates the generator, which is shown as a shunt wound instrument; 2 designates the engine; 3 the storage battery; 4 the lights and 5 the ignition coil.

On the light circuit A we place a magnet 6 provided with two armatures 7 and 8. When current is used at or above a certain rate, the magnet 6 is energized and the armatures are drawn toward it. The armature 7 makes a permanent contact at 20 while the armature 8 makes a momentary contact while passing the point 21. This action will close the circuit leading to a magnet 11, which, when so energized, will draw toward it the end *a* of a pivoted lever 13. This end *a* of the lever contacts at 14 and closes a circuit between the battery and the generator and the opposite end *b* of the lever simultaneously closes circuits 15 and 16. The circuit 16 leads to the ignition coil 5, and this closing of said circuits will set the engine and generator into operation and charge the battery.

When the lights are turned off, or the use of current is discontinued, the armatures 7 and 8 will return to the positions shown in the diagram, that is, they will move away from the magnet and break the contact 20, but, if the battery is not fully charged, the engine and generator will continue to operate until the maximum charge has been attained. When the battery is sufficiently charged the solenoid 9 closes the contact 10 by the core moving up, indicating high voltage, and this will energize the magnet 12 which is connected therewith and draw the end *b* of the lever 13 away from contacts 15 and 16, and also the opposite end *a* of the lever from the contact 14, thus breaking the circuits and stopping the engine and generator. The armature 7 is provided for the reason that a permanent closed connection at 20 would cause the system to start when the armature 8 makes the passing contact on its return movement, that is, it would start the system when all the lights were turned off, and it is desirable to have it start only when passing the point 21 in one direction, that is, when current use is started.

It is evident that our invention comprises a system in which the plant is set into operation whenever current, at or above a certain rate is used for any purpose, and one in which the plant is automatically stopped when the battery has attained a predetermined high voltage. In other words, the plant will at all times remain inactive until current is used at or above a certain predetermined rate, which rate may easily be determined by regulating in any manner, the ease with which the armatures will move, and when current at this predetermined rate is used the plant will always be put into operation.

We are aware that electric lighting systems have been heretofore devised in which the starting and stopping of the engine and generator is accomplished through means responsive to the condition of the battery charge, and we do not desire to claim such as our invention, but:—

What we claim and desire to secure by Letters Patent is:—

In an automatic electric generating system, the combination of an explosive engine; an electric generator; a storage battery; a discharge circuit; a second circuit; magnetic means in the discharge circuit, which means will operate whenever current at or above a certain rate is taken from the battery, to immediately close the circuit between the battery and the generator to start the engine; and also to simultaneously close the second circuit, and means for breaking both of said circuits when the voltage attains a predetermined high point.

In testimony whereof we affix our signatures, in presence of two witnesses.

JOHN W. FREES.
LOUIS WINTER.

Witnesses:
 LUKE A. HUYETT,
 ED. A. KELLY.